July 31, 1951 G. O. GRIDLEY 2,562,455
COLLET
Filed Oct. 11, 1946 4 Sheets-Sheet 2
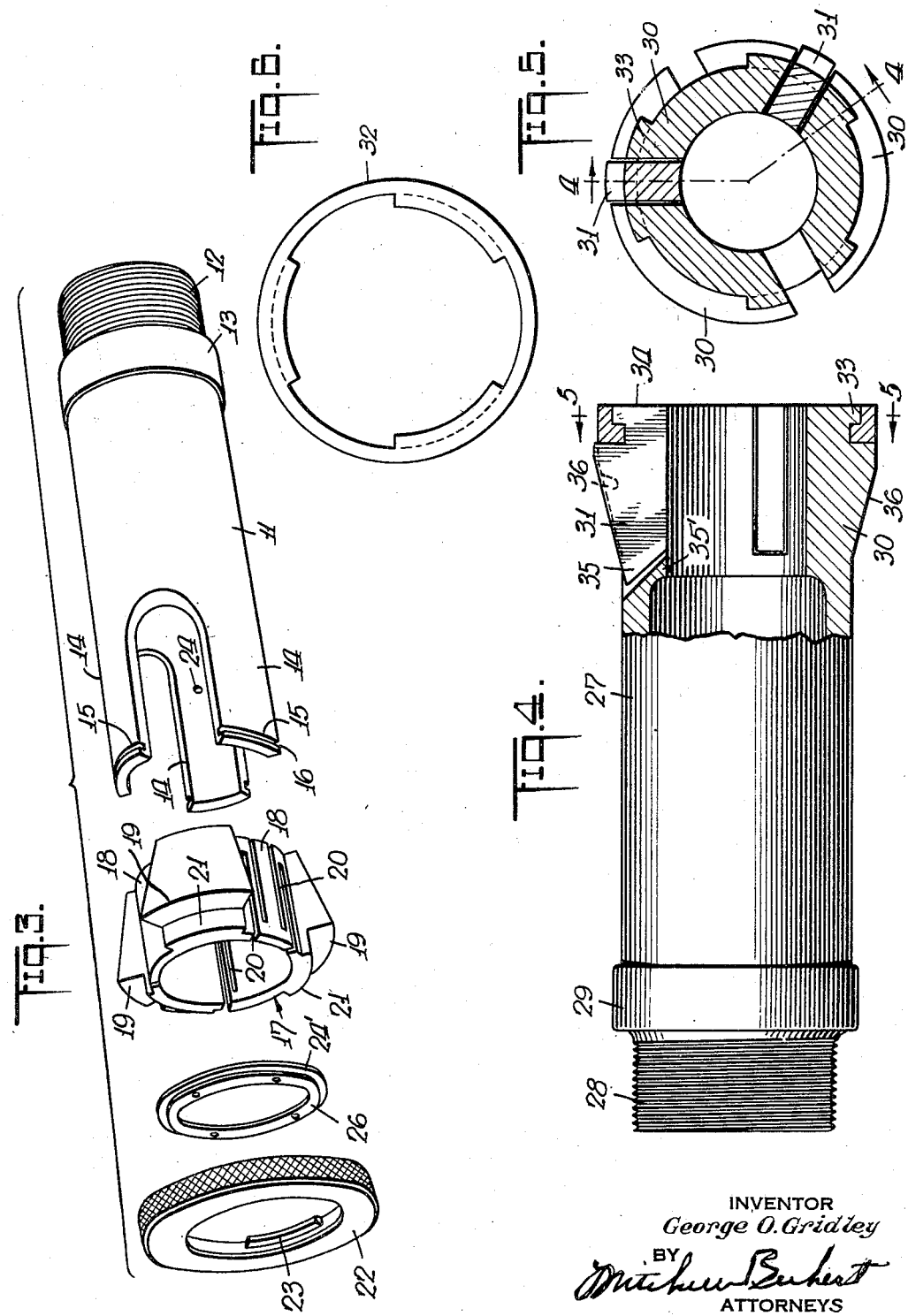
INVENTOR
George O. Gridley
BY
Mitchell Bekert
ATTORNEYS July 31, 1951  G. O. GRIDLEY  2,562,455
COLLET Filed Oct. 11, 1946  4 Sheets-Sheet 3

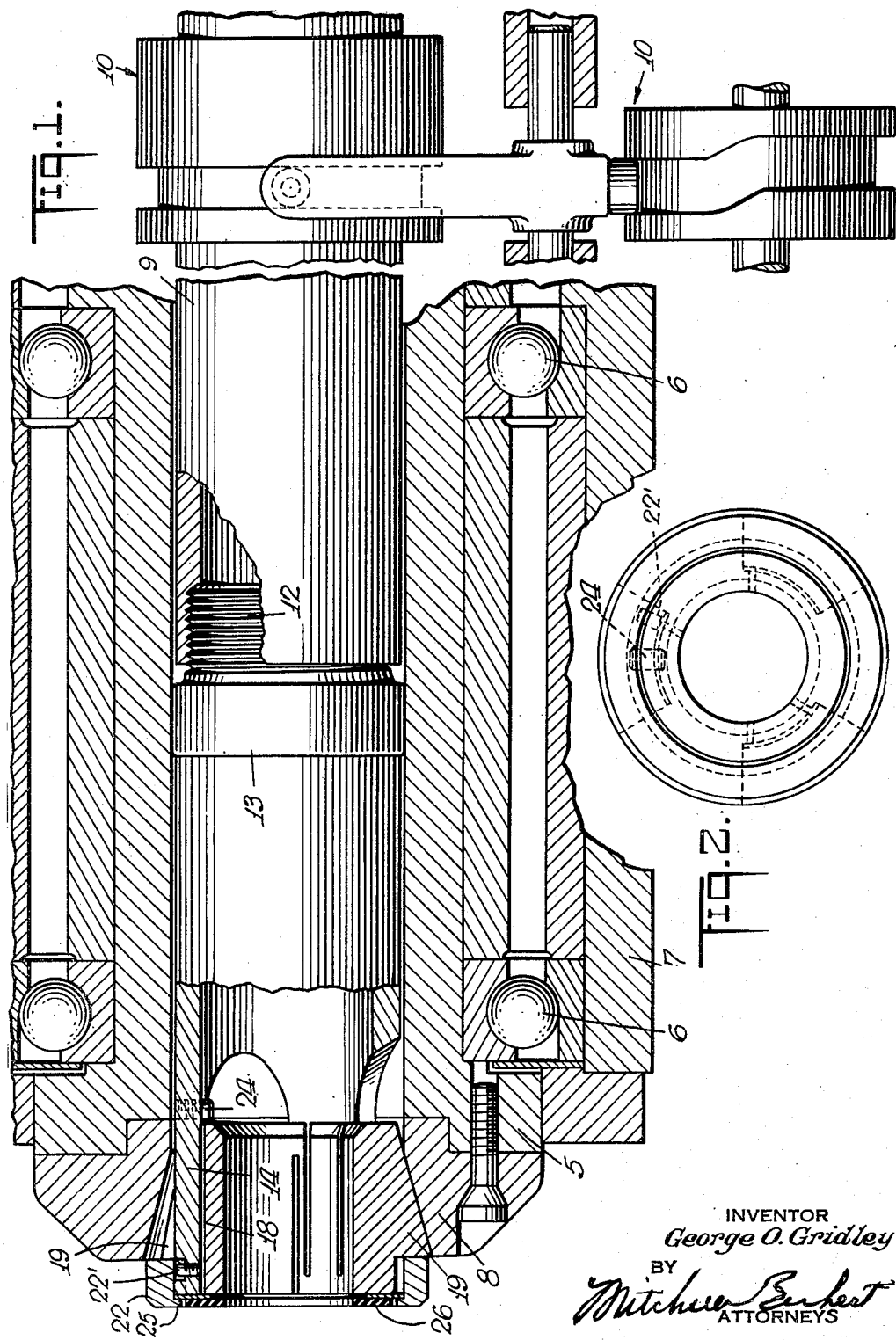

INVENTOR
George O. Gridley
BY
ATTORNEYS

July 31, 1951  G. O. GRIDLEY  2,562,455
COLLET
Filed Oct. 11, 1946  4 Sheets-Sheet 4
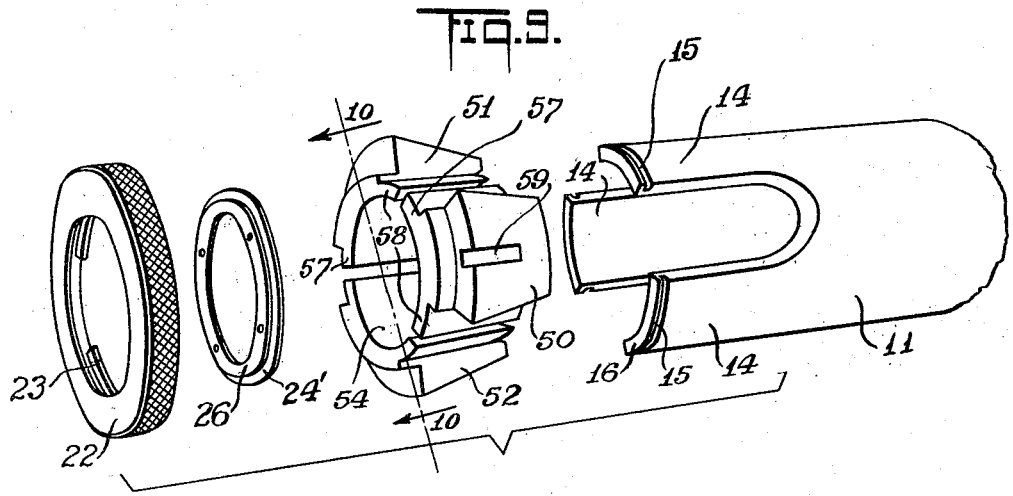
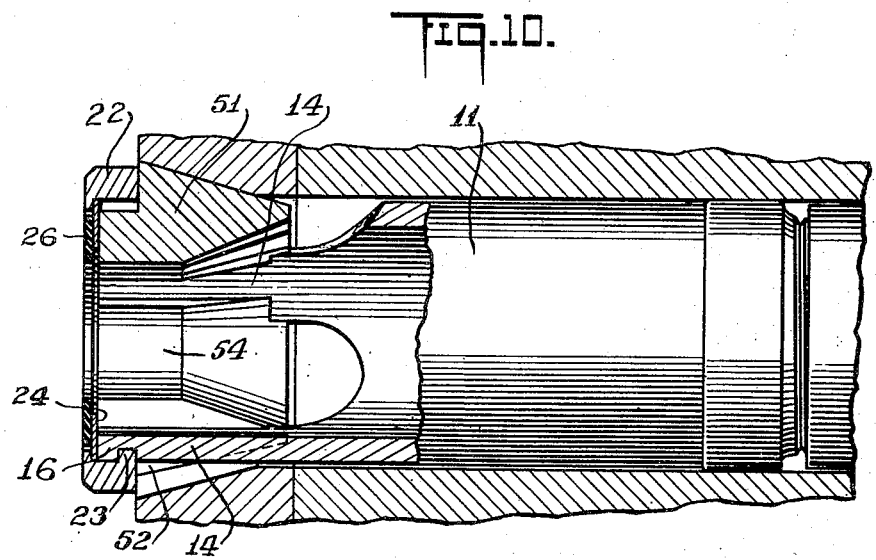
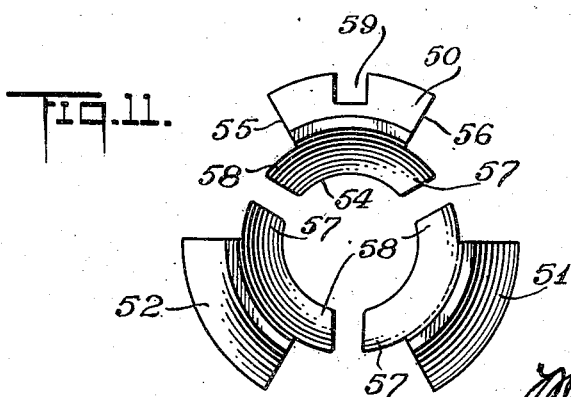
INVENTOR
George O. Gridley
BY
Mitchell Reinhart
ATTORNEYS Patented July 31, 1951

2,562,455

UNITED STATES PATENT OFFICE 2,562,455

COLLET

George O. Gridley, Berlin, Conn., assignor to The New Britain Machine Company, New Britain, Conn., a corporation of Connecticut Application October 11, 1946, Serial No. 702,767

20 Claims. (Cl. 279—46)

My invention relates to a collet and in particular to improved collets for bar machines.

It is a general object of the invention to provide an improved collet mechanism.

It is another object of the invention to provide an improved collet mechanism in which a single operation at the front of the machine will be sufficient to release or to lock securely in place collet elements selected for a given size of stock.

It is a more specific object of the invention to provide improved collet mechanisms in which collets may be changed without projecting the collet tube or otherwise disturbing the adjustment thereof.

It is a still further object to provide an improved collet mechanism in which chips can less seriously and less frequently impair operation.

Other objects and various further features of the invention will hereinafter be pointed out or will occur to those skilled in the art from a reading of the following specification together with the accompanying drawings, in which:

Fig. 1 is a fragmentary longitudinal sectional view of a spindle to which a collet mechanism according to the invention has been applied;

Fig. 2 is a front end view of the collet shown in Fig. 1;

Fig. 3 is an exploded perspective view of the parts of the collet of Fig. 1;

Fig. 4 is a view in partial longitudinal section of an alternative collet structure according to the invention;

Fig. 5 is a vertical sectional view taken substantially in the plane 5—5 of Fig. 4;

Fig. 6 is an end view of a part of the collet of Fig. 4;

Fig. 9 is an exploded perspective view of the parts of a further collet construction according to the invention;

Figure 7:
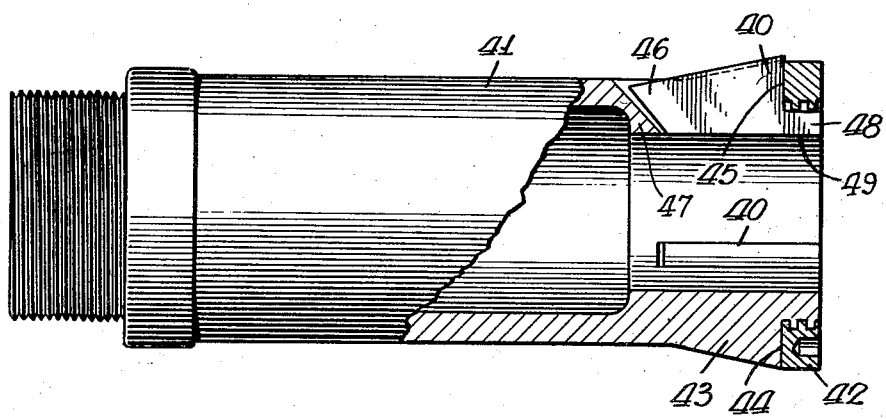
Fig. 7 is a view in partial longitudinal section of another alternative collet construction according to the invention.

Fig. 10 is a view in partial longitudinal section of an assembly of the parts of Fig. 9, taken substantially in the plane 10—10 of Fig. 9 (in Fig. 9 the plane 10—10 is indicated by a dot-dash line across the front faces of the jaws and through the axis of the collet); and Fig. 11 is a view looking right to left (in the sense of Figs. 9 and 10) at the jaw elements of Fig. 9.

Broadly speaking, my invention contemplates a collet mechanism in which a generally tubular main body member or collet holder is formed at one end with longitudinally extending fingers. These fingers embrace radially slidable jaw means, and a locking ring engageable with the outer ends of the fingers abuts the jaw means. The locking ring and the jaw means are so formed that the jaw means may be completely removed or inserted without disturbing the adjustment of the machine. In one of the specific forms to be described, the jaw means is a unitary structure having a plurality of radially cammed portions, and in the other specific forms separate radially cammed jaws are employed.

Referring to the drawings, a preferred form of my collet is shown in application to a bar machine having a spindle 5 supported on bearings 6 for rotation in the frame 7 of the machine. In the form shown, the spindle 5 is provided with a spindle nose or collet seat member 8 having an inner surface that is generally frustro-conical, flaring outwardly toward the front (left, in the sense of Fig. 1) end of the spindle. The collet mechanism itself is supported within the spindle 5; it is axially positioned or controlled by means of a collet tube 9 which forms part of a conventionally controlled drawback mechanism 10. The parts thus far described are of conventional construction and, therefore, constitute no part of my invention.

As shown, my improved collet mechanism may include a generally tubular main body member or collet holder 11 having at its rear end a threaded portion 12 for coupling to the drawback tube 9 of a conventional machine. A circumferentially extending land 13 slidably engages the inner wall of the spindle 5 for accurately positioning the collet on the axis of spindle rotation. The other end of the body member or holder 11 is shown as having a plurality of longitudinally extending fingers 14 which define a corresponding plurality of longitudinally extending slots. For a purpose which will later be clear, a circumferentially extending groove 15 is formed at the front ends of the fingers 14. Formation of the grooves 15 defines a locking lip abutment, or flange 16 on each finger 14.

In a preferred arrangement, the collet jaws are formed as a unitary structure 17 slidably receivable or embraced by the fingers 14 of the main-body member 11. The jaw means 17 is generally tubular and is formed with outer arcuate surfaces or ways 18 which may slidably ride within the correspondingly arcuate inner surfaces of the fingers 14. In the form shown, the tubular member 17 is formed integrally with a plurality of collet-jaw members 19 equally spaced peripherally and extending radially outward from the ways 18 and through the spaces between fingers 14. Preferably, the total included angle of all the jaw members 19 is substantially equal to the total included angle of all the jaw-retaining fingers 14. Each of the jaws 19 has an outer cammable surface to fit the above-mentioned generally frustro-conical surface of the spindle 8.

To render the unitary structure 17 circumferentially compressible, I have in the form shown, provided on the relatively thin-walled ways 18, a plurality of slots 20 extending longitudinally of the stock 17—each open only at one end thereof. Preferably, for each slot 20 opening at one end of the structure 17 there is immediately adjacent thereto another slot 20 opening at the other end of the structure 17.

It will be noted that the structure 17 is axially longer than the seat-engaging portions 19 thereof. Opposite each jaw element 19 this added length is accounted for by a plurality of turned down ends 21 of substantially the same radius as that of the bottoms of the grooves 15 at the ends of fingers 14. This latter construction is for a purpose which will later be clear.

To retain the unitary jaw structure 17 in position on the collet body 11, a ring 22 may be positioned to engage the grooves 15 at the ends of fingers 14, as by means of a plurality of radially inwardly directed flanges 23. In attaching the ring 22 to the fingers 14, it will be clear that the flanges 23 must first be made to slide between fingers 14 and that, once they have entered this space, a partial rotation of ring 22 will be sufficient to effect a locking engagement. Suitable stop or detent means 22' within one of the grooves 15 may be employed to retain ring 22 in its locking position.

To limit the axial freedom with which the jaw structure 17 can slide within the fingers 14, means such as a stop 24 may be formed or otherwise set in the inner surface of a finger 14 to engage the rear end of the jaw 17. The stop 24 may serve for the forcible disengagement of jaw means 19 from a jammed wedge with the collet seat member 8.

In my improved collet according to Figs. 1, 2, and 3, I show how means may be provided to prevent the collection and accumulation of chips. This means contemplates maintenance of the substantially continuous frontal area of the jaw structure 17 in continuous contact with a sealed-off continuous metal washer 24'. In the form shown, the washer 24' is seated against an inwardly directed lip or flange 25 on the locking ring 22 and it carries in its front end a further washer 26 of oil-resistant, resilient material, such as, for example, Neoprene. The resilient washer 26 may be permanently carried on the washer 24' by molding the one to the other or by other conventional forming methods. Preferably, the washer 26 extends radially inward to slightly less than the outer diameter of the stock or other material to be held in the collet. Thus, washer 26 will make a wiping contact with this material so as to exclude the entry of chips into the collet mechanism.

Referring to Figs. 4, 5 and 6, I show an alternative structure according to the invention in which separate collet jaws are radially slidable independent of the main collet body or holder 27. As in the case of the previously described body member 11, the collet body 27 is formed at its rear end with a threaded portion 28 and with a land 20. The other end of body 27 is slotted to define a plurality of longitudinally extending, sector-shaped fingers 30 for embracing and retaining the collet jaws 31. Each jaw member 31 is substantially coextensive longitudinally with the slot in which it fits and is characterized by an upper camming surface which will fit the inner surface of the collet seat member 8. As in the form which has already been described, the jaw elements 31 may be locked in position on the collet body 27 by a bayonet-type engagement between a locking ring 32 and flanges 33 at the ends of the fingers 30. In the form shown, the interlocking flanges of the ring 32 and of the fingers 30 are so arranged that for each locking engagement a ring flange spans the slot between two adjacent fingers. In this way, it will be clear that by forming the jaws 31 with locking flanges 34, the locking flanges of the locking ring 32 may simultaneously engage both the jaws 31 and the collet body 27. This arrangement has been found useful as a means for forcibly disengaging jaw elements 31 which may have jammed in their wedged positions within the spindle nose.

In accordance with a further feature of the invention, and in order to prevent one or more of the jaw elements 31 from falling out of position when stock is withdrawn or exhausted, the rear edges of the jaws 31 are each provided with a projection 35 extending longitudinally rearward. In clearance relationship with this projection 35, and axially overlapping the same, is a corresponding projection 35' formed at the back end of the recess or slots between adjacent fingers 30. With this arrangement of cooperating slopes or projections 35—35', it is clear that the jaws 31 will be permitted complete free radial motion for performance of their intended functions of engagement and disengagement with stock, but that at the same time they will be prevented by the projections 35 and 35' from dropping out of place should stock be removed.

For increased accuracy of radial arrangement or positioning of the jaws 31, I prefer that the finger or front end of the body member 27 be formed with an enlarged end which may be characterized by a frustro-conical surface 36, whereby the jaw-receiving slots or recesses between fingers 30 will be deep enough to provide improved lateral support for the jaws 31.

It will be clear that although I have not described the locking ring 32 of my second embodiment as incorporating the chip-seal means described for the first embodiment, both structures lend themselves equally well to adoption of the seal device. Application of the locking ring 22 (of Figs. 1, 2, and 3) and of the seal ring 24—26 to the collet body 27 and jaws 31 will result in an equally effective chip seal for the collet of Figs. 4, 5, and 6.

Figure 8:
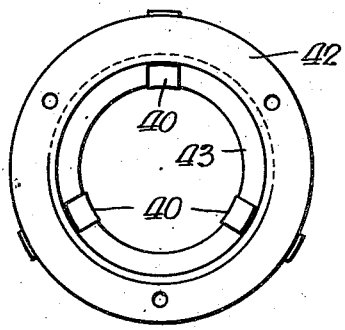
Fig. 8 is an end view of the structure of Fig. 7.

Referring to Figs. 7 and 8, I show a further collet assembly which represents a modification of the embodiment of Figs. 4, 5, and 6. Separate collet jaws 40 are again radially slidable independent of the collet body 41, but these jaws 40 are held in place by a locking ring 42 of alternative construction. In accordance with this alternative, the locking ring 42 is screw-threaded internally for engagement with correspondingly threaded portions on the fingers 43 embracing the jaws 40. Preferably, this engagement is by means of a square or nearly square thread, as shown—whereby no radial camming of the fingers 43 results from tightly seating the ring 42 against shoulders 44 on the fingers 43, or from application of heavy drawback forces.

As in the case of the jaws 31 of Fig. 4, the jaws 40 may include a front wall 45 for abutment with the ring 42, and a projecting undercut rear portion 46 axially overlapping a corresponding projection 47 on the collet body 41. With these means the jaws 40 may be positively held from dropping out of the collet body, and at the same time full freedom of radial movement permits positive, equalized, self-alining gripping by the jaws over their wedging surfaces. To extend the areas of such equalized gripping into proximity with the cutting or other working operations, the jaws 40 may be provided with forwardly projecting portions 48, riding preferably clear of the locking ring 42 and forming extended stock-gripping surfaces 49.

Referring to Figs. 9, 10, and 11, I show another collet, which represents a modification of the assembly of Figs. 1, 2, and 3. In this modification, the collet holder 11, chip-seal means 24—26, and locking ring 22 will be recognized from Fig. 1—the principal changes being in the nature of the jaw means to be received and held by these parts. As distinguished from the unitary jaw structure of the first-described arrangement, the jaw means of Fig. 9 comprises separate jaw elements 50, 51, 52. Each of these jaws preferably includes a collet-seat-engaging surface (shown generally frusto-conical), a work-gripping surface 54, and generally radially directed opposed side walls 55—56. It will be clear that, if the walls 55—56 diverge to a span greater than the separation between adjacent fingers 14 of the collet holder 11, these walls defining wedge shaped parts may serve the function of retaining the jaws against radially inward dislodgement from the collet. To permit the radially inward camming action characteristic of collet operation, there is preferably slight circumferential clearance between one of the walls 55—56 and one of the adjacent fingers 14. This clearance may be such as to permit proper collet function without causing the jaws to dislodge from the holder 11, as will be clear.

In the form shown, the jaws 50, 51, 52 also include lateral portions 57, 58 projecting generally circumferentially from points radially inward of the fingers 14. The projections 57—58 may thus serve to retain the jaws against radially outward dislodgement from the collet. Preferably, these projections 57—58 are formed with their inner surfaces flush with the work-gripping surfaces 54—so as to provide more extensive areas for the work-gripping function.

In accordance with a further feature, the entire assembly of the holder 11 and independent jaws 50, 51, 52 may be locked against rotary motion within the collet seat by suitably keying one of the jaws. In the form shown, this function is accomplished by keying one of the jaws (50), as by a key slot 59, to a corresponding key slot (not shown) in the collet seat. It will be appreciated that, having thus locked one of the jaws (50) against rotation, the holder 11 and in turn the other jaws 51, 52 may be properly retained against rotation within the collet seat.

It will be clear that I have described relatively simple collet devices for meeting the above-defined objectives. In these devices, the jaw means may be removed in a single simple operation even though the stock remains in the machine. If it is desired to accommodate a different size of stock, the previous jaw element can be simply replaced by those of another size and then locked in place by means of the same locking ring, while the collet body remains more or less permanently installed in the machine.

While I have described my invention in detail for the preferred forms shown, it will be understood that modifications may be made within the scope of the invention as defined in the claims which follow.

I claim:

1. In a collet assembly, a collet holder including a plurality of longitudinally extending fingers at one end thereof, jaw means including portions extending between said fingers, and bayonet-joint locking means engageable with the extremities of said fingers.

2. In a collet assembly, a generally tubular member having longitudinally extending fingers at one end thereof, said fingers being substantially equally spaced peripherally of said member, the ends of said fingers being formed with a radially inwardly directed groove peripherally thereof, jaw means including portions extending between said fingers and into clearance relationship with the circumferential projection of said groove, and annular locking means including radially inwardly directed flange means in said grooves.

3. In a collet assembly, a generally tubular member having fingers extending longitudinally at one end thereof, jaw means comprising a unitary circumferentially compressible structure having portions extending radially between said fingers, and locking means including an annular portion engageable with said fingers.

4. In a machine of the character indicated, a spindle nose having a frustro-conical collet seat, jaw means comprising a circumferentially compressible unitary structure having radially extending portions engageable with said collet seat, axial positioning means including finger means extending between said radially extending portions of said jaw means and locking means including an annular member engageable with said finger means.

5. In a collet assembly, a generally tubular member having longitudinally extending fingers at one end thereof, said fingers being substantially equally spaced peripherally of said member, the total included angle of said fingers being substantially equal to the total included angle of the spaces between said fingers, jaw means including substantially radially extending portions in sliding abutment with the sides of said fingers, and locking means including an annular member engageable with the ends of said fingers.

6. In a collet assembly, a generally tubular member having fingers extending longitudinally at one end thereof, jaw means including portions extending radially between said fingers, locking means including an annular member engageable with the ends of said fingers, said annular member having an inwardly directed flange, and sealing means receivable between said flange and the ends of said fingers, said sealing means including a circumferentially extending piece of yieldable material having an inner diameter approximating the external diameter of the material to be held by said collet assembly.

7. In a collet, a first tubular member having coextensive longitudinally extending fingers at one end thereof, a second tubular member having outer cylindrical surfaces embraceable by said fingers, means included on said second tubular member for rendering said second tubular member resiliently compressible circumferentially, said second tubular member having outwardly extending portions radially displaceable between said fingers, and a locking ring engageable with the ends of said fingers.

8. In a collet assembly, a generally tubular member having longitudinally extending fingers at the nose end thereof, jaw means extending between said fingers and having an outer exposed camming surface, the nose ends of said fingers and of said jaw means including abutment means to be engaged, the spaces between fingers at the nose end of said tubular member being at least as wide as the effective width of the parts of said jaw means fitting between said fingers, and removable locking means including a ring detachably longitudinally engaging the abutment means of both the ends of said fingers and of said jaw means.

9. In a collet assembly, a tubular member having coextensive longitudinally extending fingers at one end, jaw means between said fingers and having portions substantially coplanar with the ends of said fingers, locking means including radially outwardly directed flanges on said jaw means and on the ends of said fingers, and a rotatable bayonet joint locking ring having radially inwardly directed flanges engageable with said flanges on said jaw means and on said fingers.

10. In a collet assembly, a generally cylindrical main body member including at one end a plurality of longitudinally extending jaw-embracing fingers, a locking ring threadedly engageable with end portions of said fingers, and jaw means including portions extending between said fingers and in abuttable relation with said ring, said threaded engagement including substantially plane radial interfitting thread surfaces on said fingers and on said ring, whereby substantially no radial displacing action can occur between said fingers and said ring.

11. In a collet assembly, a collet holder having a plurality of longitudinally extending jaw-embracing fingers at one end thereof, external threads at the ends of said fingers, jaw means including portions extending radially between said fingers, and an internally threaded locking ring engageable with the threads on said fingers.

12. A collet comprising a generally frustroconical block to fit a collet seat, said block having a central stock-receiving bore therein, and a plurality of longitudinally extending ways extending inwardly to define a relatively thin wall adjacent said bore, said wall being split longitudinally so as to render the collet circumferentially compressible.

13. As an article of manufacture, a collet holder comprising a member with a plurality of substantially coextensive angularly spaced longitudinally extending jaw-receiving fingers at one end thereof, the extremities of said fingers being also angularly spaced and including generally circumferentially extending axially locking abutment means including a substantially plane radial surface for locking engagement with a circumferentially continuous locking ring, whereby upon placement of the ring the spaces between finger extremities may be closed off so that the ring may retain and directly actuate jaws held in the spaces between fingers.

14. A collet jaw comprising a block having a longitudinally extending work-gripping surface, a collet-seat-engaging surface extending at an angle with said work-gripping surface, the front of said block having a locking-ring-receiving groove extending from proximity to said seat-engaging surface and toward said work-gripping surface.

15. In a collet assembly, a generally cylindrical main body member including at one end a plurality of longitudinally extending jaw-embracing fingers, a locking ring engageable with end portions of said fingers, and a jaw between adjacent of said fingers, said jaw including a work-gripping surface, a collet-seat engaging surface, and circumferentially directed projections extending radially under said adjacent fingers, whereby said projections may serve to retain said jaw against dislodgment radially outwardly from said main body member.

16. In a collet assembly, a generally cylindrical collet holder having longitudinally extending jaw-embracing fingers, and a jaw between adjacent of said fingers, said jaw including a collet-seat engaging surface radially outwardly of said holder, a work-gripping surface radially inward of said holder, and generally opposed radially extending sides diverging to an extent greater than the span between said adjacent fingers, whereby said sides in cooperation with said adjacent fingers may prevent radially inward dislocation of said jaw from said holder.

17. In a collet assembly, a collet holder having a plurality of jaw-embracing fingers, a plurality of jaw members between said fingers, and key means on one of said jaw members for cooperation with a key means on a collet seat, whereby when seated the jaws of said assembly may all be held by said key means against angular displacement.

18. In a collet assembly, a collet holder having a plurality of jaw-embracing fingers, and a plurality of jaws between said fingers, each of said jaws including an outer collet-seat engaging surface, an inner work-gripping surface, generally radially extending sides diverging to an extent greater than the closest span between adjacent fingers.

19. In a drawback collet, a rigid hollow tubular holder having a plurality of angularly spaced longitudinal fingers defining jaw-receiving recesses open at the nose end thereof, and means at the rear end of said holder for engagement with a drawback actuating mechanism; jaw means including stock-engaging means of a minimum internal dimension less than the bore of said holder, means to be angularly located by said fingers and of a maximum effective angular width less than the angular width of the recesses at the nose end of said collet, and collet-seat engaging means projecting externally of said holder; and a circumferentially continuous retaining and actuating ring including means axially locked to and removable at the nose ends of said fingers, said ring having a bore with a minimum internal dimension between the inner and outer radial limits of said jaw means, whereby said ring may directly actuate said jaw means and said jaw means may be removed out the nose end of said collet upon a dislocating operation of said ring at the nose end of said collet.

20. A collet according to claim 19, in which said ring and said fingers engage each other with interfitting substantially plane radial surfaces, whereby upon collet actuation there may be no substantial tendency to deform said fingers out of engagement with said ring.

GEORGE O. GRIDLEY.

REFERENCES CITED

The following references are of record in the file of this patent:

UNITED STATES PATENTS

| Number | Name | Date |
|---|---|---|
| 514,073 | Hesse | Feb. 6, 1894 |
| 1,407,760 | Kreusler et al. | Feb. 28, 1922 |
| 1,535,048 | Schumer | Apr. 21, 1925 |
| 1,680,632 | Palaith | Aug. 14, 1928 |
| 1,808,288 | Chapman | June 2, 1931 |
| 2,228,685 | Benjamin | Jan. 14, 1941 |
| 2,337,400 | Maute | Dec. 21, 1943 |
| 2,374,769 | Musante | May 1, 1945 |

OTHER REFERENCES

American Machinist, page 57, June 16, 1921.